United States Patent
Oota

(10) Patent No.: US 8,549,056 B2
(45) Date of Patent: Oct. 1, 2013

(54) APPARATUS AND PROGRAM FOR ARCTANGENT CALCULATION

(75) Inventor: Masato Oota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 664 days.

(21) Appl. No.: 12/813,044

(22) Filed: Jun. 10, 2010

(65) Prior Publication Data

US 2011/0004645 A1    Jan. 6, 2011

(30) Foreign Application Priority Data

Jul. 3, 2009 (JP) .................................. 2009-158913

(51) Int. Cl.
*G06F 1/02* (2006.01)

(52) U.S. Cl.
USPC ......................................... 708/276; 708/440

(58) Field of Classification Search
None
See application file for complete search history.

(56) References Cited

U.S. PATENT DOCUMENTS

| | | | | |
|---|---|---|---|---|
| 4,710,892 A * | 12/1987 | Fling | ............................. | 708/440 |
| 4,841,552 A | 6/1989 | Kingston | | |
| 4,893,316 A * | 1/1990 | Janc et al. | .................... | 708/300 |
| 5,648,924 A | 7/1997 | Smith | | |
| 6,385,633 B1 * | 5/2002 | Schmidl | ........................ | 708/441 |
| 6,470,366 B1 | 10/2002 | Kakura et al. | | |
| 6,470,367 B1 | 10/2002 | Yeh et al. | | |
| 6,643,678 B2 * | 11/2003 | Van Wechel et al. | ......... | 708/530 |
| 2006/0059215 A1 | 3/2006 | Maharatna et al. | | |
| 2007/0124352 A1 | 5/2007 | Wittig | | |

FOREIGN PATENT DOCUMENTS

| | | |
|---|---|---|
| JP | 54-104249 | 8/1979 |
| JP | 58-500044 | 1/1983 |
| JP | 58-178478 | 10/1983 |
| JP | 02-029021 A | 1/1990 |
| JP | 02-232724 | 9/1990 |
| JP | 04-111019 | 4/1992 |
| JP | 05-347643 | 12/1993 |
| JP | 10-308714 | 11/1998 |
| JP | 2000-099314 | 4/2000 |
| JP | 2000-155672 | 6/2000 |
| JP | 2002-009856 | 1/2002 |
| JP | 2003-092607 | 3/2003 |
| WO | 2006/099532 A2 | 9/2006 |

OTHER PUBLICATIONS

Japanese Decision of a Patent Grant No. 2009-158913 dated May 24, 2011.
European Search Report application No. 10165899.5 dated Mar. 30, 2011.

* cited by examiner

*Primary Examiner* — Michael D Yaary
(74) *Attorney, Agent, or Firm* — Squire Sanders (US) LLP

(57) ABSTRACT

An arctangent calculation apparatus includes a phase angle memory unit in which a phase angle is stored in advance, the phase angle corresponding to a two-dimensional vector value corresponding to in a range of 0° to substantially 22.5°; a vector rotation unit that performs a vector rotation operation on a two-dimensional vector value corresponding to in a range of 0° to 360° and converts the two-dimensional vector value corresponding to in a range of 0° to 360° into a two-dimensional vector value corresponding to in a range of 0° to substantially 2.5°; an arctangent calculation unit that outputs, from the phase angle memory unit, a phase angle that corresponds to the two-dimensional vector value corresponding to in a range of 0° to substantially 22.5°; and a phase angle conversion unit that converts the phase angle into a phase angle in a range of 0° to 360°.

10 Claims, 10 Drawing Sheets

| | INPUT-SIDE CONVERSION TABLE 21 | | | REVERSE CONVERSION TABLE 22 | | | |
|---|---|---|---|---|---|---|---|
| ANGLE 21D | X SIGN 21A | Y SIGN 21B | DETERMINATION CONDITION 21C | X2 22A | Y2 | DIRECTION D1 | OFFSET VALUE A1 |
| 0 TO 45 | + | + | $|X| \geq |Y|$ | X | Y | + | 0 |
| 45 TO 90 | + | + | $|X| < |Y|$ | Y | X | − | $\pi/2$ |
| 90 TO 135 | − | + | $|X| < |Y|$ | Y | −X | + | $\pi/2$ |
| 135 TO 180 | − | + | $|X| \geq |Y|$ | −X | Y | − | $\pi$ |
| 180 TO 225 | − | − | $|X| \geq |Y|$ | −X | −Y | + | $\pi$ |
| 225 TO 270 | − | − | $|X| < |Y|$ | −Y | −X | − | $3\pi/2$ |
| 270 TO 315 | + | − | $|X| < |Y|$ | −Y | X | + | $3\pi/2$ |
| 315 TO 360 | + | − | $|X| \geq |Y|$ | X | −Y | − | $2\pi$ |

FIG.6

| INPUT | REVERSE CONVERSION | | | |
|---|---|---|---|---|
| ANGLE | X1 | Y1 | DIRECTION D2 | θ OFFSET VALUE A2 |
| 0 TO 22.5 | X2 | Y2 | + | 0 |
| 22.5 TO 45 | (X2+Y2) | (X2−Y2) | − | D1 × π/4 |

FIG.10

| | INPUT-SIDE CONVERSION TABLE 41 | | | REVERSE CONVERSION TABLE | | | |
|---|---|---|---|---|---|---|---|
| ANGLE 41D | X SIGN 41A | Y SIGN 41B | DETERMINATION CONDITION 41C | X7 42A | Y7 | DIRECTION D3 | θ OFFSET VALUE A3 42 |
| - | 0 | 0 | - | 0 | 0 | + | 0 |
| 0° TO 22.5° | + | + | 5X≥12Y | X | Y | + | 0 |
| 22.5° TO 45° | + | + | X≥Y AND 5X<12Y | (X+Y) | (X-Y) | - | $\pi/4$ |
| 45° TO 67.5° | + | + | X<Y AND 5Y<12X | (X+Y) | (-X+Y) | + | $\pi/4$ |
| 67.5° TO 90° | + | + | 5Y≥12X | Y | X | - | $\pi/2$ |
| 90° TO 112.5° | - | + | 5Y≥-12X | Y | -X | + | $\pi/2$ |
| 112.5° TO 135° | - | + | -X<Y AND 5Y<-12X | (-X+Y) | (X+Y) | - | $3\pi/4$ |
| 135° TO 157.5° | - | + | -X≥Y AND -5X<12Y | (-X+Y) | (-X-Y) | + | $3\pi/4$ |
| 157.5° TO 180° | - | + | -5X≥12Y | -X | Y | - | $\pi$ |
| 180° TO 202.5° | - | - | -5X≥-12Y | -X | -Y | + | $\pi$ |
| 202.5° TO 225° | - | - | -X≥-Y AND -5X<-12Y | (-X-Y) | (-X+Y) | - | $5\pi/4$ |
| 225° TO 242.5° | - | - | -X<-Y AND -5Y<-12X | (-X-Y) | (X-Y) | + | $5\pi/4$ |
| 242.5° TO 270° | - | - | -5Y≥-12X | -Y | -X | - | $3\pi/2$ |
| 270° TO 292.5° | + | - | -5Y≥12X | -Y | X | + | $3\pi/2$ |
| 292.5° TO 315° | + | - | X<-Y AND -5Y<12X | (X-Y) | (-X-Y) | - | $7\pi/4$ |
| 315° TO 337.5° | + | - | X≥-Y AND 5X<-12Y | (X-Y) | (X+Y) | + | $7\pi/4$ |
| 337.5° TO 360° | + | - | 5X≥-12Y | X | -Y | - | $2\pi$ |

REQUIRED TABLE SIZE

REQUIRED TABLE SIZE

US 8,549,056 B2

APPARATUS AND PROGRAM FOR ARCTANGENT CALCULATION

CROSS-REFERENCE TO RELATED APPLICATION

This application is based upon and claims the benefit of priority of the prior Japanese Patent Application No. 2009-158913, filed on Jul. 3, 2009, the entire contents of which are incorporated herein by reference.

FIELD

The embodiments discussed herein are directed to an arctangent calculation apparatus and an arctangent calculation program for calculating and outputting phase angles from two-dimensional vector values.

BACKGROUND

In recent years, in a variety of technological fields such as high-speed communication processing, digital image processing, and fuzzy control processing; the use of an arctangent calculation apparatus has become necessary for carrying out speedy calculation and output of phase angles from two-dimensional vector values.

However, as far as conventional arctangent calculation apparatuses are concerned, the demand for speedy calculation and output leads to an increase in the circuit size.

In regard to that problem, conventional arctangent calculation apparatuses include, for example, a technology has been disclosed in which the circuit size is limited by performing repetitive implementation of the coordinate rotation digital computer (CORDIC) algorithm.

Moreover, a technology has been disclosed in which a read only memory (ROM) table is created for managing phase angles corresponding to two-dimensional vector values and then a phase angle is output according to an input two-dimensional vector value.

However, in the case of using a ROM table, the volume of data to be managed therein increases substantially. Hence, it becomes necessary to increase the memory size in the ROM table thereby leading to an increase in the circuit size.

In regard to such a problem, as a technology disclosed in recent years for reducing the volume of data in a ROM table and controlling the circuit size, the logarithm of two-dimensional vector values is obtained or the degree of accuracy is lowered except for the necessary value range.

Furthermore, as a conventional arctangent calculation apparatus, a technology has been disclosed for limiting the circuit size by maintaining, as a table, arctangent function $\arctan(x)-x$ instead of arctangent function $\arctan(x)$ and performing addition of an input value x with respect to the result of arctangent function $\arctan(x)-x$ to obtain the arctangent result.

Besides, as a compromise plan between using the CORDIC algorithm and using a ROM table, a technology has been disclosed that implements a calculation method for speedy convergence in a small table with the use of an addition theorem.

Moreover, as a conventional arctangent calculation apparatus, a method has been disclosed for converting two-dimensional vector values corresponding to in the range of 0° to 360° into two-dimensional vector values corresponding to in the range of 0° to 45° in order to control the value range that is input to an arctangent calculation unit.

Furthermore, as a conventional arctangent calculation apparatus, a technology has been disclosed that implements a method of calculating arctangent function $\arctan(\alpha)$ by straight-line approximation. In that method, $\alpha=y\div x$ is calculated with respect to a two-dimension vector value (X, Y) and, if the value of $\alpha$ is within a predetermined range, it is determined that approximation is done to a specific straight line.

The conventional technologies as described above are disclosed in for example Japanese Laid-open Patent Publication Nos. 54-104249, 58-500044, 10-308714, 04-111019, 02-232724, 2000-99314, 2002-9856, 2003-92607, 05-347643, 2000-155672 and 58-178478.

In a conventional arctangent calculation apparatus, upon conversion of a two-dimensional vector value corresponding to in the range of 0° to 360° into a two-dimensional vector value corresponding to in the range of 0° to 45°; the arctangent calculation unit outputs, from a phase angle ROM, a phase angle corresponding to the two-dimensional vector value corresponding to in the range of 0° to 45°.

However, in a conventional arctangent calculation apparatus, an enormous volume of data is managed in the phase angle ROM that is used in managing phase angles corresponding to the two-dimensional vector values corresponding to in the range of 0° to 45°. For that reason, the memory size of the phase angle ROM is large thereby leading to an increase in the circuit size.

SUMMARY

According to an aspect of an embodiment of the invention, an arctangent calculation apparatus includes a phase angle memory unit in which a phase angle is stored in advance, the phase angle corresponding to a two-dimensional vector value corresponding to in a range of 0° to substantially 22.5°; a vector rotation unit that performs a vector rotation operation on a two-dimensional vector value corresponding to in a range of 0° to 360° and converts the two-dimensional vector value corresponding to in a range of 0° to 360° into a two-dimensional vector value corresponding to in a range of 0° to substantially 22.5°; an arctangent calculation unit that outputs, from the phase angle memory unit, a phase angle that corresponds to the two-dimensional vector value corresponding to in a range of 0° to substantially 22.5° obtained by conversion by the vector rotation unit; and a phase angle conversion unit that converts the phase angle output by the arctangent calculation unit into a phase angle in a range of 0° to 360°.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 6 is an explanatory diagram for explaining the contents of a conversion table used during a 45° vector rotation operation performed by a 45° vector rotation unit according to the second embodiment;

FIG. 10 is an explanatory diagram for explaining the contents of a batch conversion table according to the fourth embodiment;

DESCRIPTION OF EMBODIMENTS

Preferred embodiments of the present invention will be explained with reference to accompanying drawings.

[a] First Embodiment

Figure 1:
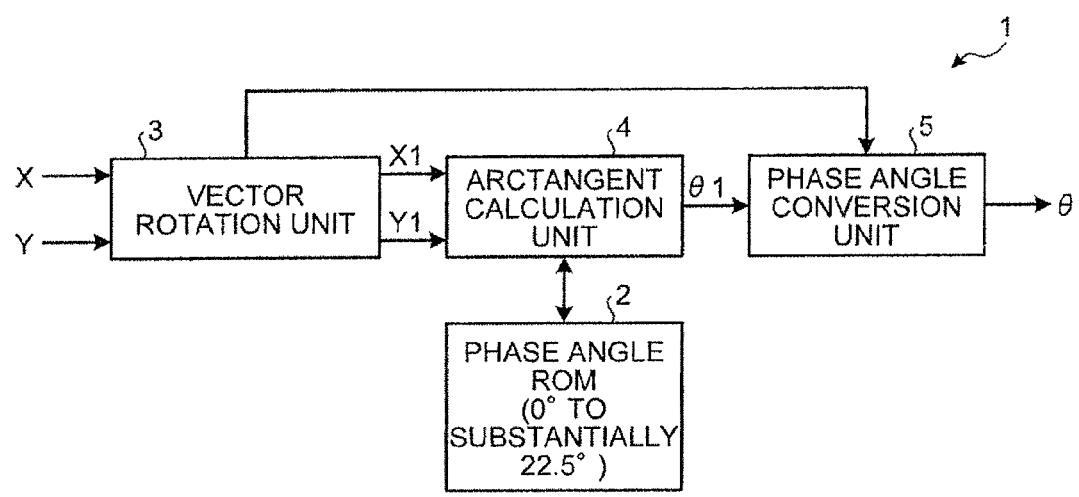
FIG. 1 is a block diagram of an internal configuration of an arctangent calculation apparatus according to a first embodiment.
Figure 2:
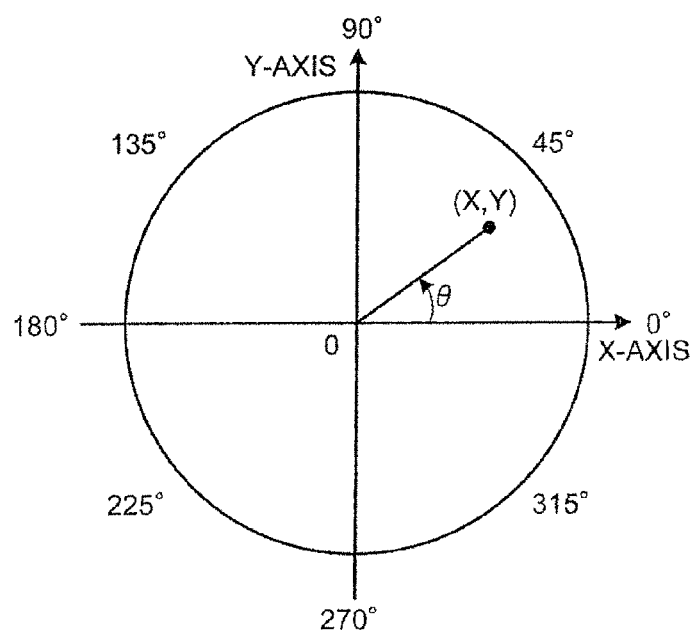
FIG. 2 is an explanatory diagram for explaining the relation between two-dimensional vector values and phase angles.

FIG. 1 is a block diagram of an internal configuration of an arctangent calculation apparatus according to a first embodiment. FIG. 2 is an explanatory diagram for explaining the relation between two-dimensional vector values and phase angles.

As illustrated in FIG. 2, an arctangent calculation apparatus 1 calculates and outputs a phase angle θ corresponding to a two-dimensional vector value (X, Y) corresponding to in the range of 0° to 360°.

The arctangent calculation apparatus 1 includes a phase angle ROM 2 in which is stored, in advance, phase angles θ1 corresponding to two-dimensional vector values (X1, Y1) corresponding to in the range of 0° to substantially 22.5°. Herein, an angle of substantially 22.5° is assumed to be equivalent to, for example, the angle of 22.5° that is half of 45°.

Moreover, the arctangent calculation apparatus 1 includes a vector rotation unit 3 that, upon detecting a two-dimensional vector value (X, Y) corresponding to in the range of 0° to 360°, performs a vector rotation operation on that two-dimensional vector value (X, Y).

By performing the vector rotation operation on the two-dimensional vector value (X, Y), the vector rotation unit 3 converts the two-dimensional vector value (X, Y) into a two-dimensional vector value (X1, Y1) corresponding to in the range of 0° to substantially 22.5°.

In addition, the arctangent calculation apparatus 1 includes an arctangent calculation unit 4 that outputs, from the phase angle ROM 2, a phase angle θ1 that corresponds to each two-dimensional vector value (X1, Y1) corresponding to in the range of 0° to substantially 22.5° that is obtained by conversion by the vector rotation unit 3.

Moreover, the arctangent calculation apparatus 1 includes a phase angle conversion unit 5 that, upon detecting the output of a phase angle θ1 within the range of 0° to substantially 22.5° from the arctangent calculation unit 4, converts that phase angle θ1 into a phase angle θ within the range of 0° to 360°.

In the first embodiment, two-dimensional vector values (X, Y) corresponding to in the range of 0° to 360° are subjected to value range control for conversion into two-dimensional vector values (X1, Y1) corresponding to in the range of 0° to 22.5° and then input to the arctangent calculation unit 4. Thus, the phase angle ROM 2 needs to store therein only the phase angles θ1 corresponding to the two-dimensional vector values (X1, Y1) corresponding to in the range of 0° to 22.5°. That enables achieving reduction in the memory size of the phase angle ROM 2 as compared to the conventional cases. Hence, according to the first embodiment, it becomes possible to downsize the circuit size of the arctangent calculation apparatus 1.

[b] Second Embodiment

Figure 3:
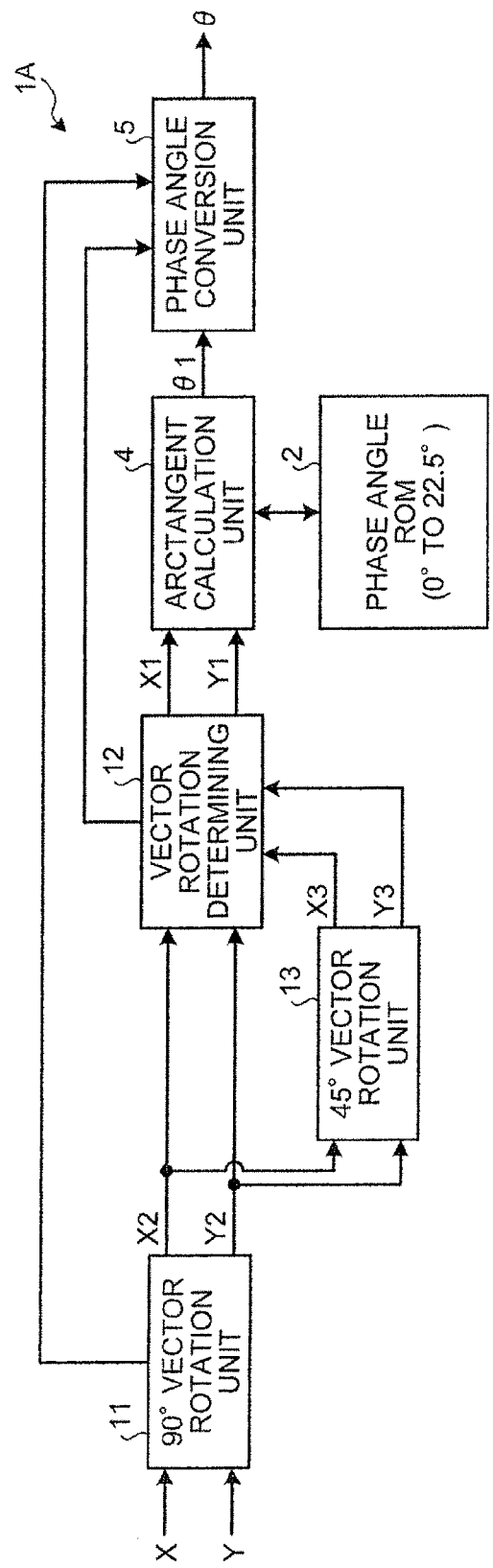
FIG. 3 is a block diagram of an internal configuration of an arctangent calculation apparatus according to a second embodiment.

Described below is an arctangent calculation apparatus according to a second embodiment. FIG. 3 is a block diagram of an internal configuration of an arctangent calculation apparatus according to the second embodiment. Herein, the constituent elements identical to those in the arctangent calculation apparatus 1 according to the first embodiment are referred to by the same reference numerals and the redundant explanation regarding the configuration and operations is not repeated.

As illustrated in FIG. 3, apart from the phase angle ROM 2, the arctangent calculation unit 4, and the phase angle conversion unit 5; an arctangent calculation apparatus 1A includes a 90° vector rotation unit 11 that performs 90° vector rotation operation on two-dimensional vector values (X, Y) corresponding to in the range of 0° to 360°.

By performing the 90° vector rotation operation on a two-dimensional vector value (X, Y) corresponding to in the range of 0° to 360°, the 90° vector rotation unit 11 converts that two-dimensional vector value (X, Y) into a two-dimensional vector value (X2, Y2) corresponding to in the range of 0° to 45°.

Moreover, the arctangent calculation apparatus 1A includes a vector rotation determining unit 12 that determines whether a two-dimensional vector value (X2, Y2) obtained by conversion using the 90° vector rotation operation is a two-dimensional vector value corresponding to in the range of 0° to 22.5°.

If the two-dimensional vector value (X2, Y2) is a two-dimensional vector value corresponding to in the range of 0° to 22.5°, then the arctangent calculation unit 4 outputs, from the phase angle ROM 2, a phase angle θ1 corresponding to the two-dimensional vector value (X1, Y1).

Upon detecting the output of the phase angle θ1 corresponding to the two-dimensional vector value (X1, Y1) from the arctangent calculation unit 4, the phase angle conversion unit 5 converts that phase angle θ1 into a phase angle θ within the range of 0° to 360°.

Furthermore, the arctangent calculation apparatus 1A also includes a 45° vector rotation unit 13 that performs 45° vector rotation operation on a two-dimensional vector value (X2, Y2) if that two-dimensional vector value (X2, Y2) is not a two-dimensional vector value corresponding to in the range of 0° to 22.5°.

Upon performing the 45° vector rotation operation on a two-dimensional vector value (X2, Y2), the 45° vector rotation unit 13 inverts that two-dimensional vector value (X2, Y2) by 180° around the X-coordinate axis (0° axis) on the positive side. As a result, the two-dimensional vector value (X2, Y2) is converted into a two-dimensional vector value (X3, Y3) corresponding to in the range of 0° to 22.5°. Meanwhile, the 45° vector rotation operation includes 45° vector rotation as well as the 180° inversion.

Then, the 45° vector rotation unit 13 inputs the two-dimensional vector value (X3, Y3) corresponding to in the range of 0° to 22.5° as a two-dimensional vector value (X1, Y1) to the arctangent calculation unit 4 via the vector rotation determining unit 12.

Meanwhile, if a two-dimensional vector value (X2, Y2) is a two-dimensional vector value corresponding to in the range of 0° to 22.5°, then the vector rotation determining unit 12 inputs that two-dimensional vector value (X2, Y2) as a two-dimensional vector value (X1, Y1) to the arctangent calculation unit 4.

Figures 4, 5:
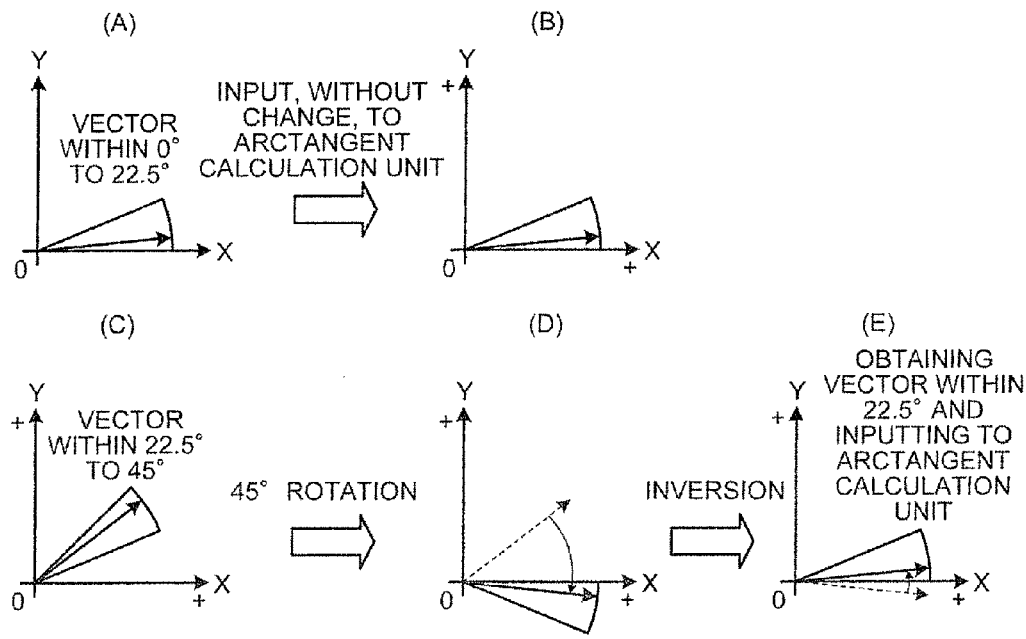
FIG. 4 is an explanatory diagram for explaining the contents of a conversion table used during a 90° vector rotation operation performed by a 90° vector rotation unit according to the second embodiment.
FIG. 5 is an explanatory diagram for explaining the operations prior to an input to an arctangent calculation unit according to the second embodiment.

FIG. 4 is an explanatory diagram for explaining the contents of a conversion table used during the 90° vector rotation operation performed by the 90° vector rotation unit 11.

A conversion table 20 illustrated in FIG. 4 includes an input-side conversion table 21 that is used in converting two-dimensional vector values (X, Y) corresponding to in the range of 0° to 360° into two-dimensional vector values (X2, Y2) corresponding to in the range of 0° to 45°.

The input-side conversion table 21 is configured to manage a determination condition 21C for determining whether a two-dimensional vector value (X, Y) lies within 45° based on the comparison of the modulus of (XY) of that two-dimensional vector value (X, Y) with a corresponding X sign 21A indicating the X-coordinate-side sign and a corresponding Y sign 21B indicating the Y-coordinate-side sign of that two-dimensional vector values (X, Y).

Besides, the input-side conversion table 21 is configured to manage an angular range 21D of a two-dimensional vector value (X, Y) according to the corresponding X sign 21A, the corresponding Y sign 21B, and the determination condition 21C.

The conversion table 20 also includes a reverse conversion table 22 that is configured to convert two-dimensional vector values (X, Y) corresponding to in the range of 0° to 360° into two-dimensional vector values (X2, Y2) corresponding to in the range of 0° to 45°.

Thus, the reverse conversion table 22 are managed post-90°-vector-rotation two-dimensional vector values (X2, Y2) 22A, respective sign directions D1, and respective θ offset values A1.

FIG. 5 is an explanatory diagram for explaining the operations prior to an input to the arctangent calculation unit 4.

As illustrated in sections (A) and (B) in FIG. 5, if a two-dimensional vector value (X2, Y2) corresponding to in the range of 0° to 45° is a two-dimensional vector value corresponding to in the range of 0° to 22.5°, then the vector rotation determining unit 12 inputs that two-dimensional vector value (X2, Y2) to the arctangent calculation unit 4.

Subsequently, the arctangent calculation unit 4 detects that two-dimensional vector value (X2, Y2) as a two-dimensional vector value (X1, Y1) and outputs, from the phase angle ROM 2, a phase angle θ1 corresponding to that two-dimensional vector value (X1, Y1).

In contrast, as illustrated in section (C) in FIG. 5, if a two-dimensional vector value (X2, Y2) corresponding to in the range of 0° to 45° is not a two-dimensional vector value corresponding to in the range of 0° to 22.5°, then the vector rotation determining unit 12 makes sure that the 45° vector rotation operation is performed on the two-dimensional vector value (X2, Y2).

The 45° vector rotation unit 13 performs the 45° vector rotation operation on the two-dimensional vector value (X2, Y2) and converts it into a two-dimensional vector value illustrated in section (0) in FIG. 5.

Upon performing the 45° vector rotation operation on the two-dimensional vector value (X2, Y2), the 45° vector rotation unit 13 inverts the two-dimensional vector value (X2, Y2) by 180° around the 0° axis as illustrated in section (E) in FIG. 5. As a result, the two-dimensional vector value (X2, Y2) is converted into a two-dimensional vector value (X3, Y3) corresponding to in the range of 0° to 22.5°.

The arctangent calculation unit 4 then detects the two-dimensional vector value (X3, Y3) corresponding to in the range of 0° to 22.5° as a two-dimensional vector value (X1, Y1) and outputs, from the phase angle ROM 2, a phase angle θ1 corresponding to that two-dimensional vector value (X1, Y1).

FIG. 6 is an explanatory diagram for explaining the contents of a conversion table used during the 45° vector rotation operation performed by the 45° vector rotation unit 13.

A conversion table 30 illustrated in FIG. 6 is configured to manage input angular ranges 31, post-45°-vector-rotation and post-vector-rotation-determination two-dimensional vector values (X1, Y1) 32, sign directions D2, and θ offset values A2 in a corresponding manner.

When the phase angle conversion unit 5 detects the output of a phase angle θ1 within the range of 0° to 22.5° from the arctangent calculation unit 4, it converts the phase angle θ1 into a phase angle θ within the range of 0° to 360° by making use of the conversion table 30 illustrated in FIG. 6 and the conversion table 20 illustrated in FIG. 4.

When the phase angle conversion unit 5 detects the output of a phase angle θ1 within the range of 0° to 22.5° from the arctangent calculation unit 4; it calculates a phase angle θ2, which is yet to be subjected to the 45° vector rotation operation by the 45° vector rotation unit 13, by using D1×A2+D2×θ1.

In addition, upon calculating the phase angle θ2, the phase angle conversion unit 5 calculates a phase angle θ within the range of 0° to 360°, which is yet to be subjected to the 90° vector rotation operation by the 90° vector rotation unit 11, by using A1+D1×θ2.

That is, by using θ=(A1+A2)+(D1×D2)×θ1, the phase angle conversion unit 5 converts a phase angle θ1 within the range of 0° to 22.5° into a phase angle θ within the range of 0° to 360°.

Explained below are the operations performed by the arctangent calculation apparatus 1A according to the second embodiment.

When the 90° vector rotation unit 11 in the arctangent calculation apparatus 1A detects a two-dimensional vector value (X, Y) corresponding to in the range of 0° to 360°, it performs the 90° vector rotation operation on the two-dimensional vector value (X, Y) with the use of the conversion table 20 illustrated in FIG. 4.

By performing the 90° vector rotation operation on the two-dimensional vector value (X, Y), the 90° vector rotation unit 11 converts the two-dimensional vector value (X, Y) into a two-dimensional vector value (X2, Y2) corresponding to in the range of 0° to 45°.

If the two-dimensional vector value (X2, Y2) corresponding to in the range of 0° to 45° is a two-dimensional vector value corresponding to in the range of 0° to 22.5°, then the vector rotation determining unit 12 outputs that two-dimensional vector value (X2, Y2) without change to the arctangent calculation unit 4.

The arctangent calculation unit 4 detects the two-dimensional vector value (X2, Y2) as a two-dimensional vector value (X1, Y1), outputs a phase angle θ1 corresponding to that two-dimensional vector value (X1, Y1) from the phase angle ROM 2, and inputs the phase angle θ1 to the phase angle conversion unit 5.

If the two-dimensional vector value (X2, Y2) corresponding to in the range of 0° to 45° is not a two-dimensional vector value corresponding to in the range of 0° to 22.5°, the vector rotation determining unit 12 inputs the two-dimensional vector value (X2, Y2) into the 45° vector rotation unit 13.

The 45° vector rotation unit 13 performs the 45° vector rotation operation on the two-dimensional vector value (X2, Y2) and then inverts the two-dimensional vector value (X2, Y2) by 180° around the 0° axis. Thus, the 45° vector rotation unit 13 converts the two-dimensional vector value (X2, Y2) into a two-dimensional vector value (X3, Y3) corresponding to in the range of 0° to 22.5° and inputs that two-dimensional vector value (X3, Y3) into the vector rotation determining unit 12.

Then, the vector rotation determining unit 12 inputs the two-dimensional vector value (X3, Y3) as a two-dimensional vector value (X1, Y1) to the arctangent calculation unit 4.

The arctangent calculation unit 4 outputs, from the phase angle ROM 2, a phase angle θ1 corresponding to the two-dimensional vector value (X1, Y1) and inputs the phase angle θ1 to the phase angle conversion unit 5.

The phase angle conversion unit 5 then converts the phase angle θ1 within the range of 0° to 22.5° into a phase angle θ within the range of 0° to 360° by using θ=(A1+A2)+(D1×D2)×θ1.

Hence, in the arctangent calculation apparatus 1A, it is the phase angle conversion unit 5 that obtains a phase angle θ within the range of 0° to 360°.

In the second embodiment, two-dimensional vector values (X, Y) corresponding to in the range of 0° to 360° are subjected to value range control for conversion into two-dimensional vector values (X1, Y1) corresponding to in the range of 0° to 22.5° and then input to the arctangent calculation unit 4. Thus, the phase angle ROM 2 needs to store therein only the phase angles θ1 corresponding to the two-dimensional vector values (X1, Y1) corresponding to in the range of 0° to 22.5°. That enables achieving reduction in the memory size of the phase angle ROM 2 as compared to the conventional cases. Hence, according to the second embodiment, it becomes possible to downsize the circuit size of the arctangent calculation apparatus 1A as well as keep the manufacturing cost and the power consumption in check.

Moreover, in the second embodiment, if a two-dimensional vector value (X2, Y2) corresponding to in the range of 0° to 45° obtained by conversion is a two-dimensional vector value corresponding to in the range of 0° to 22.5°, then it is possible to output a phase angle θ1 that corresponds to that two-dimensional vector value from the phase angle ROM 2.

Furthermore, in the second embodiment, if a two-dimensional vector value (X2, Y2) corresponding to in the range of 0° to 45° obtained by conversion is not a two-dimensional vector value corresponding to in the range of 0° to 22.5°, then that two-dimensional vector value is subjected to the 45° vector rotation operation in order to obtain a two-dimensional vector value corresponding to in the range of 0° to 22.5°. Subsequently, a phase angle θ1 corresponding to that two-dimensional vector value can be output from the phase angle ROM 2.

Moreover, in the second embodiment, a two-dimensional vector value (X3, Y3) that is output upon conversion by the 45° vector rotation unit 13 can be accurately represented as (X2+Y2, X2−Y2)/$\sqrt{2}$. However, since only a phase angle is required as the arctangent calculation result, 1/$\sqrt{2}$ times can be ignored. Thus, during the 45° vector rotation operation, a two-dimensional vector value (X3, Y3) can be obtained with only one step of an adder without having to use a multiplier. For that reason, the processing delay can be restricted to the minimum.

Meanwhile, in the second embodiment, the vector rotation determining unit 12 and the 45° vector rotation unit 13 are disposed in between the 90° vector rotation unit 11 and the arctangent calculation unit 4. Alternatively, the vector rotation determining unit 12 and the 45° vector rotation unit 13 can also be disposed at a prior stage of the 90° vector rotation unit 11. The explanation for that case is given below in a third embodiment.

[c] Third Embodiment

Figure 7:
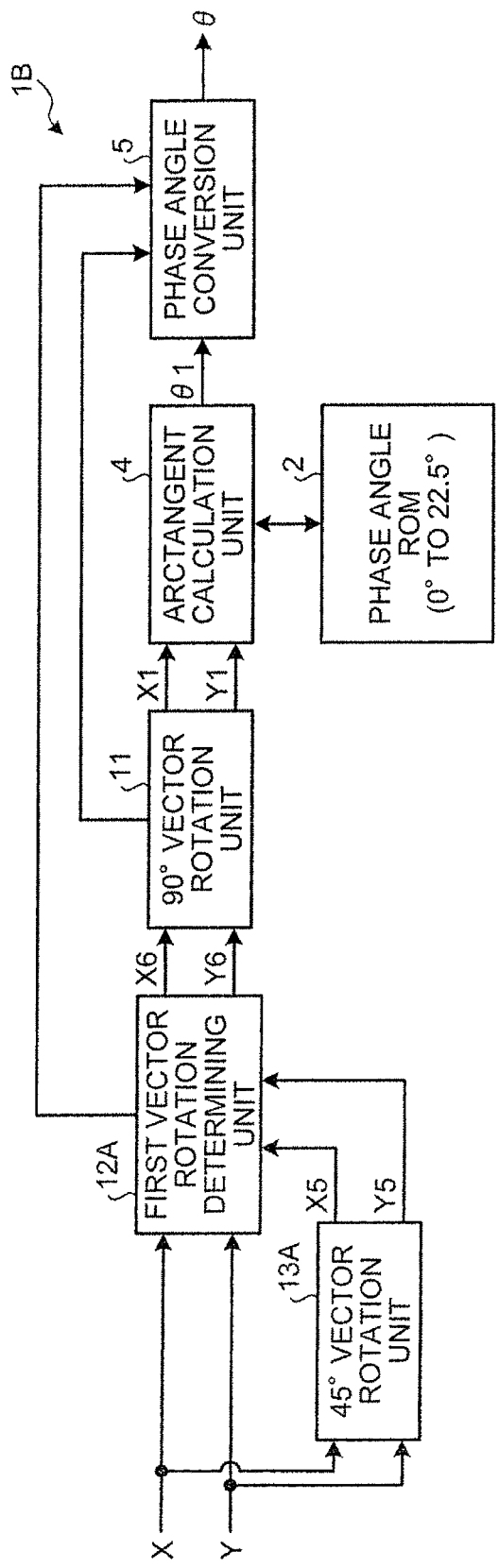
FIG. 7 is a block diagram of an internal configuration of an arctangent calculation apparatus according to a third embodiment.

FIG. 7 is a block diagram of an internal configuration of an arctangent calculation apparatus according to the third embodiment. Herein, the constituent elements identical to those in the arctangent calculation apparatus 1A according to the second embodiment are referred to by the same reference numerals and the redundant explanation regarding the configuration and operations is not repeated.

In an arctangent calculation apparatus 1B according to the third embodiment, at the input stage of the arctangent calculation unit 4 is disposed the 90° vector rotation unit 11 and at the input stage of the 90° vector rotation unit 11 is disposed a first vector rotation determining unit 12A. Moreover, in the arctangent calculation apparatus 1B, at the input stage of the first vector rotation determining unit 12A is disposed a 45° vector rotation unit 13A.

Figure 8:
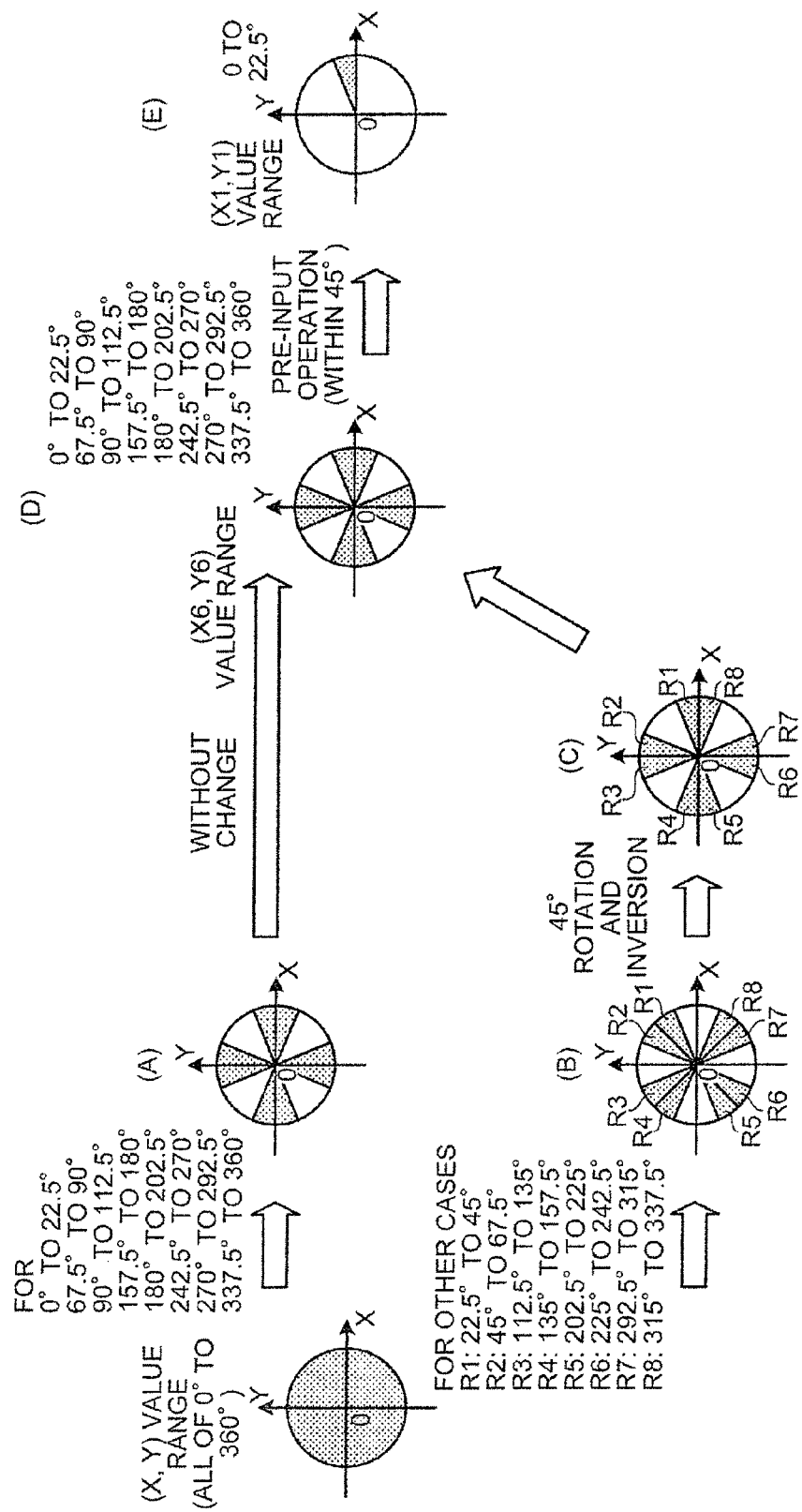
FIG. 8 is an explanatory diagram for explaining the operations related to the 45° vector rotation operation performed by a 45° vector rotation unit according to the third embodiment.

FIG. 8 is an explanatory diagram for explaining the operations related to the 45° vector rotation operation performed by the 45° vector rotation unit 13A.

When the first vector rotation determining unit 12A detects a two-dimensional vector value (X, Y) corresponding to in the range of 0° to 360°, it determines whether the two-dimensional vector value (X, Y) is a two-dimensional vector value corresponding to 22.5° or less from the closest coordinate axis. Besides, the first vector rotation determining unit 12A identifies a two-dimensional vector value (X, Y) corresponding to in the range of 0° to 360° as a two-dimensional vector value corresponding to in one of 16 angular ranges of 22.5°. Meanwhile, the coordinate axes include the 0° axis, the 90° axis, the 180° axis, and the 270° axis.

As an example of the case when the two-dimensional vector value (X, Y) is a two-dimensional vector value corresponding to 22.5° or less from the closest coordinate axis, a two-dimensional vector value corresponding to in the range of 0° to 22.5° can be considered. More particularly, a two-dimensional vector value can be corresponding to in eight angular ranges, namely, the range of 0° to 22.5°, the range of 67.5° to 90°, the range of 90° to 112.5°, the range of 157.5° to 180°, the range of 180° to 202.5°, the range of 247.5° to 270°, the range of 270° to 292.5°, and the range of 337.5° to 360° inside the range of 0° to 360°.

That is, if a two-dimensional vector value (X, Y) is not a two-dimensional vector value corresponding to 22.5° or less from the closest coordinate axis; then, as illustrated in section (B) in FIG. 8, the two-dimensional vector value lies within one of eight angular ranges R1 to R8 that are different than the abovementioned eight angular ranges.

Meanwhile, if a two-dimensional vector value (X, Y) is not a two-dimensional vector value corresponding to 22.5° or less from the closest coordinate axis, then the first vector rotation determining unit 12A makes sure that the 45° vector rotation unit 13A performs the 45° vector rotation operation on the two-dimensional vector value (X, Y).

Upon performing the 45° vector rotation operation on the two-dimensional vector value (X, Y), the 45° vector rotation unit 13A inverts that two-dimensional vector value by 180° around the corresponding coordinate axis. As a result, the two-dimensional vector value (X, Y) is converted into a two-dimensional vector value illustrated in section (C) in FIG. 8.

Thus, with respect to a two-dimensional vector value corresponding to in the range R3 (in section (B) in FIG. 8), the 45° vector rotation unit 13A performs the 45° vector rotation operation and then inverts that two-dimensional vector value around the corresponding coordinate axis so that the two-dimensional vector value is converted into a two-dimensional vector value corresponding to in the range R3 (in section (C) in FIG. 8).

Hence, even if a two-dimensional vector value is not corresponding to in a 22.5° range, the 45° vector rotation unit 13A converts that two-dimensional vector value into a two-dimensional vector value (X5, Y5) corresponding to in a 22.5° range as illustrated in section (D) in FIG. 8.

When the first vector rotation determining unit 12A detects the two-dimensional vector value (X, Y) or (X5, Y5) corresponding to in a 22.5° range, it inputs a two-dimensional vector value (X6, Y6) corresponding to in a 22.5° range to the 90° vector rotation unit 11.

The 90° vector rotation unit 11 performs the 90° vector rotation operation on the two-dimensional vector value (X6, Y6) corresponding to in a 22.5° range and converts the two-dimensional vector value (X6, Y6) into a two-dimensional vector value (X1, Y1) corresponding to in the range of 0° to 22.5° as illustrated in section (E) in FIG. 8. Then, the 90° vector rotation unit 11 inputs the two-dimensional vector value (X1, Y1) to the arctangent calculation unit 4.

Explained below are the operations performed by the arctangent calculation apparatus 1B according to the third embodiment.

The first vector rotation determining unit 12A in the arctangent calculation apparatus 1B determines whether a two-dimensional vector value (X, Y) is a two-dimensional vector value corresponding to 22.5° or less from the closest coordinate axis.

If the two-dimensional vector value (X, Y) is a two-dimensional vector value corresponding to 22.5° or less from the closest coordinate axis (see section (A) in FIG. 8), then the first vector rotation determining unit 12A inputs the two-dimensional vector value (X, Y) as a two-dimensional vector value (X6, Y6) to the 90° vector rotation unit 11.

Upon detecting the two-dimensional vector value (X6, Y6), the 90° vector rotation unit 11 performs the 90° vector rotation operation on the two-dimensional vector value (X6, Y6) and converts it into a two-dimensional vector value (X1, Y1) corresponding to in the range of 0° to 22.5° as illustrated in section (E) in FIG. 8.

Subsequently, the 90° vector rotation unit 11 inputs the two-dimensional vector value (X1, Y1) to the arctangent calculation unit 4.

Meanwhile, if a two-dimensional vector value (X, Y) is not a two-dimensional vector value corresponding to 22.5° or less from the closest coordinate axis (see section (B) in FIG. 8), then the first vector rotation determining unit 12A makes sure that the 45° vector rotation operation is performed on the two-dimensional vector value (X, Y).

The 45° vector rotation unit 13A performs the 45° vector rotation operation on the two-dimensional vector value (X, Y), converts it into a two-dimensional vector value (X5, Y5) corresponding to in a 22.5° range as illustrated in sections (C) and (D) in FIG. 8, and then inputs the two-dimensional vector value (X5, Y5) corresponding to in a 22.5° range to the first vector rotation determining unit 12A.

The first vector rotation determining unit 12A detects that two-dimensional vector value (X5, Y5) corresponding to in a 22.5° range and inputs is as a two-dimensional vector value (X6, Y6) to the 90° vector rotation unit 11.

When the arctangent calculation unit 4 detects a two-dimensional vector value (X1, Y1) corresponding to in the range of 0° to 22.5°; it outputs, from the phase angle ROM 2, a phase angle θ1 corresponding to the two-dimensional vector value (X1, Y1) and inputs the phase angle θ1 to the phase angle conversion unit 5.

When the phase angle conversion unit 5 detects the output of the phase angle θ1 within the range of 0° to 22.5° from the arctangent calculation unit 4, it converts the phase angle θ1 within the range of 0° to 22.5° into a phase angle θ within the range of 0° to 360° by using θ=(A1+A2)+(D1×D2)×θ1.

Hence, in the arctangent calculation apparatus 1B, it is the phase angle conversion unit 5 that obtains a phase angle θ within the range of 0° to 360°.

In the third embodiment, two-dimensional vector values (X, Y) corresponding to in the range of 0° to 360° are subjected to value range control for conversion into two-dimensional vector values (X1, Y1) corresponding to in the range of 0° to 22.5° and then input to the arctangent calculation unit 4. Thus, the phase angle ROM 2 needs to store therein only the phase angles θ1 corresponding to the two-dimensional vector values (X1, Y1) corresponding to in the range of 0° to 22.5°. That enables achieving reduction in the memory size of the phase angle ROM 2 as compared to the conventional cases. Hence, according to the third embodiment, it becomes possible to downsize the circuit size of the arctangent calculation apparatus 1B as well as keep the manufacturing cost and the power consumption in check.

Moreover, in the third embodiment, if a two-dimensional vector value (X, Y) is a two-dimensional vector value corresponding to 22.5° or less from the closest coordinate axis, then that two-dimensional vector value is subjected to the 90° vector rotation operation in order to obtain a two-dimensional vector value corresponding to in the range of 0° to 22.5°. Subsequently, a phase angle θ1 corresponding to that two-dimensional vector value can be output from the phase angle ROM 2.

Furthermore, in the third embodiment, if a two-dimensional vector value (X, Y) is not a two-dimensional vector value corresponding to 22.5° or less from the closest coordinate axis, then that two-dimensional vector value is first subjected to the 45° vector rotation operation and then subjected to the 90° vector rotation operation. Hence, it becomes possible to obtain the two-dimensional vector value corresponding to in the range of 0° to 22.5°. Subsequently, a phase angle θ1 corresponding to that two-dimensional vector value can be output from the phase angle ROM 2.

Meanwhile, in the abovementioned second embodiment, at the input stage of the arctangent calculation unit 4 is disposed the vector rotation determining unit 12 and at the input stage of the vector rotation determining unit 12 are disposed the 90° vector rotation unit 11 and the 45° vector rotation unit 13. However, alternatively, the 90° vector rotation operation of the 90° vector rotation unit 11 and the 45° vector rotation operation of the 45° vector rotation unit 13 can be performed in a concurrent manner. The explanation for that case is given below in a fourth embodiment.

[d] Fourth Embodiment

Figure 9:
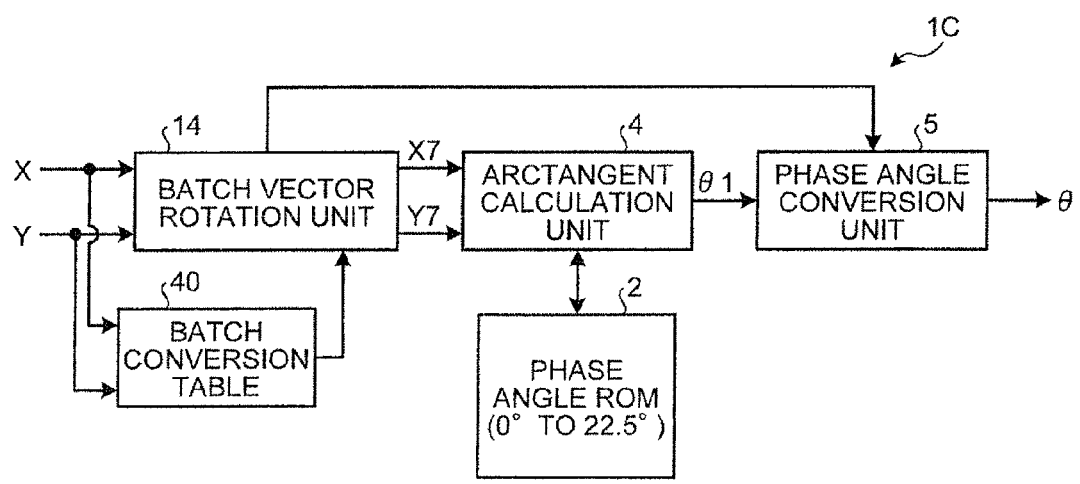
FIG. 9 is a block diagram of an internal configuration of an arctangent calculation apparatus according to a fourth embodiment.

FIG. 9 is a block diagram of an internal configuration of an arctangent calculation apparatus according to the fourth embodiment. Herein, the constituent elements identical to those in the arctangent calculation apparatus 1A according to the second embodiment are referred to by the same reference numerals and the redundant explanation regarding the configuration and operations is not repeated.

An arctangent calculation apparatus 10 according to the fourth embodiment includes the phase angle ROM 2, the arctangent calculation unit 4, the phase angle conversion unit 5, and a batch vector rotation unit 14 that functions as a substitute for the 90° vector rotation unit 11, the vector rotation determining unit 12, and the 45° vector rotation unit 13.

The batch vector rotation unit 14 is disposed at the input stage of the arctangent calculation unit 4 for batch-converting two-dimensional vector values (X, Y) corresponding to in the range of 0° to 360° into two-dimensional vector values (X7, Y7) corresponding to in the range of 0° to 22.5°.

The batch vector rotation unit 14 includes a batch conversion table 40 that is used to manage the conditions for batch-converting two-dimensional vector values (X, Y) corresponding to in the range of 0° to 360° into two-dimensional vector values (X7, Y7) corresponding to in the range of 0° to 22.5°.

In the phase angle ROM 2 is managed the phase angles $\theta 1$ corresponding to two-dimensional vector values (X7, Y7) corresponding to in the range of 0° to 22.5°.

FIG. 10 is an explanatory diagram for explaining the contents of the batch conversion table 40.

The batch conversion table 40 illustrated in FIG. 10 includes an input-side conversion table 41 that is used in converting two-dimensional vector values (X, Y) corresponding to in the range of 0° to 360° into two-dimensional vector values (X7, Y7) corresponding to in the range of 0° to 22.5°.

The input-side conversion table 41 is configured to manage a determination condition 41C for a two-dimensional vector value (X, Y) based on the comparison of (XY) of that two-dimensional vector value (X, Y) with a corresponding X sign 41A indicating the X-coordinate-side sign and a corresponding Y sign 41B indicating the Y-coordinate-side sign of that respective two-dimensional vector value (X, Y).

Among the determination conditions 41C, "X<Y" is used as a 45° determination condition for determining whether a two-dimensional vector values (X, Y) is within 45° and "5.0X<12.0Y" is used as a 22.5° determination condition for determining whether a two-dimensional vector value (X, Y) is within 22.5°. Herein, although "5.0X<12.0Y" is given as the determination condition for determining whether a two-dimensional vector value (X, Y) is within 22.5°, it actually determines proximity to 22.5°. However, for the sake of simplicity in the explanation, "5.0X<12.0Y" is used as the determination condition for determining whether a two-dimensional vector value (X, Y) is within 22.5°.

Besides, the input-side conversion table 41 is configured to manage an angular range 41D of a two-dimensional vector value (X, Y) according to the corresponding X sign 41A, the corresponding Y sign 41B, and the determination condition 41C.

The batch conversion table 40 also includes a reverse conversion table 42 that is configured to convert two-dimensional vector values (X, Y) corresponding to in the range of 0° to 360° into two-dimensional vector values (X7, Y7) corresponding to in the range of 0° to 22.5°.

In the reverse conversion table 42 are managed post-batch-conversion two-dimensional vector values (X7, Y7) 42A, sign directions D3, and $\theta$ offset values A3.

When the batch vector rotation unit 14 detects a two-dimensional vector value (X, 1) corresponding to in the range of 0° to 360°, it converts that two-dimensional vector value (X, Y) into a two-dimensional vector value (X7, Y7) corresponding to in the range of 0° to 22.5° based on the determination conditions 41C in the batch conversion table 40.

The arctangent calculation unit 4 then detects the two-dimensional vector value (X7, Y7) corresponding to in the range of 0° to 22.5° and outputs, from the phase angle ROM 2, a phase angle $\theta 1$ that corresponds to the two-dimensional vector value (X7, Y7).

The phase angle conversion unit 5 detects the phase angle $\theta 1$ within the range of 0° to 22.5° and converts it into a phase angle $\theta$ within the range of 0° to 360° by using the batch conversion table 40 illustrated in FIG. 10 and using $\theta = A3 + D3 \times \theta 1$.

Explained below are the operations performed by the arctangent calculation apparatus 1C according to the fourth embodiment.

The batch vector rotation unit 14 in the arctangent calculation apparatus 1C illustrated in FIG. 9 detects a two-dimensional vector value (X, Y) corresponding to in the range of 0° to 360°.

Then, based on the X sign 41A, the Y sign 41B, and the determination condition 41C specified in the batch conversion table 40, the batch vector rotation unit 14 converts the two-dimensional vector value (X, Y) into a two-dimensional vector value (X7, Y7) corresponding to in the range of 0° to 22.5°.

Upon obtaining the two-dimensional vector value (X7, Y7) corresponding to in the range of 0° to 22.5° by conversion, the batch vector rotation unit 14 inputs the two-dimensional vector value (X7, Y7) to the arctangent calculation unit 4.

The arctangent calculation unit 4 detects the two-dimensional vector value (X7, Y7) corresponding to in the range of 0° to 22.5° and outputs, from the phase angle ROM 2, a phase angle $\theta 1$ that corresponds to the two-dimensional vector value (X7, Y7).

When the phase angle conversion unit 5 detects the output of the phase angle $\theta 1$ within the range of 0° to 22.5° from the arctangent calculation unit 4, it converts the phase angle $\theta 1$ into a pre-batch-vector-rotation phase angle $\theta$ within the range of 0° to 360° by using the batch conversion table 40 illustrated in FIG. 10 and using $A3 + D3 \times \theta 1$.

Hence, in the arctangent calculation apparatus 1C, it is the phase angle conversion unit 5 that obtains a phase angle $\theta$ within the range of 0° to 360°.

In the fourth embodiment, two-dimensional vector values (X, Y) corresponding to in the range of 0° to 360° are subjected to value range control for conversion into two-dimensional vector values (X7, Y7) corresponding to in the range of 0° to 22.5° and then input to the arctangent calculation unit 4. Thus, the phase angle ROM 2 needs to store therein only the phase angles $\theta 1$ corresponding to the two-dimensional vector values (X7, Y7) corresponding to in the range of 0° to 22.5°. That enables achieving substantial reduction in the memory size of the phase angle ROM 2 as compared to the conventional cases. Hence, according to the fourth embodiment, it becomes possible to downsize the circuit size of the arctangent calculation apparatus 1C as well as keep the manufacturing cost and the power consumption in check.

Moreover, in the fourth embodiment, since the batch vector rotation unit 14 can perform the 45° vector rotation operation and the 90° vector rotation operation in a concurrent manner; the processing speed thereof can be enhanced substantially.

Figure 11A:
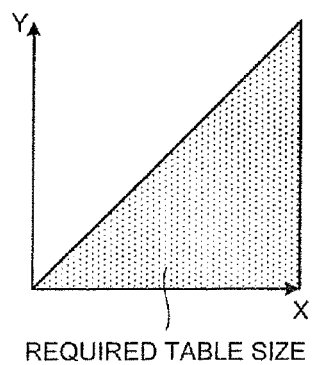
FIGS. 11A and 11B are explanatory diagrams for explaining a memory size reduction effect regarding a phase angle ROM according to the fourth embodiment.

FIG. 11 is an explanatory diagram for explaining a memory size reduction effect regarding the phase angle ROM 2.

In FIG. 11, it is illustrated that the use of the batch conversion table 40 enables achieving reduction in the memory size of the phase angle ROM 2 to about half as compared to a phase angle ROM that is used to obtain phase angles corresponding to two-dimensional vector values corresponding to in the range of 0° to 45° by simply looking up in the table therein.

Figure 11B:
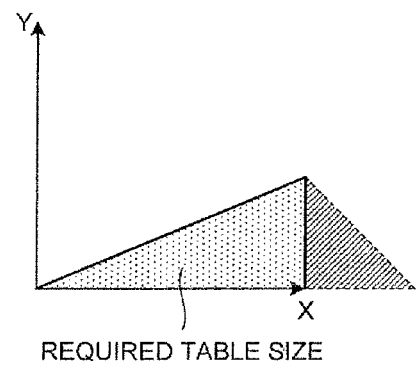

Moreover, when the batch conversion table 40 is used; then, as illustrated in FIG. 11B, the modulus becomes equal to $\sqrt{2}$ times due to the 45° vector rotation operation. Hence, the maximum value on the X-coordinate axis (0° axis) increases. However, in exchange of $1/\sqrt{2}$ times or in exchange of the degree of accuracy, if an operation is performed to reduce the modulus by ½ times or ½+⅛ times, then it becomes possible to achieve reduction in the memory size equal to the shaded portion in FIG. 11B as well as to make the maximum value on the X-coordinate axis equal to that illustrated in FIG. 11A.

Meanwhile, in the abovementioned second embodiment, at the input stage of the arctangent calculation unit 4 is disposed the 45° vector rotation unit 13. However, alternatively, in between the 45° vector rotation unit 13 and the arctangent calculation unit 4 can also be disposed a vector rotation unit that makes use of arctangent function. The explanation for that case is given below in a fifth embodiment.

[e] Fifth Embodiment

Figure 12:
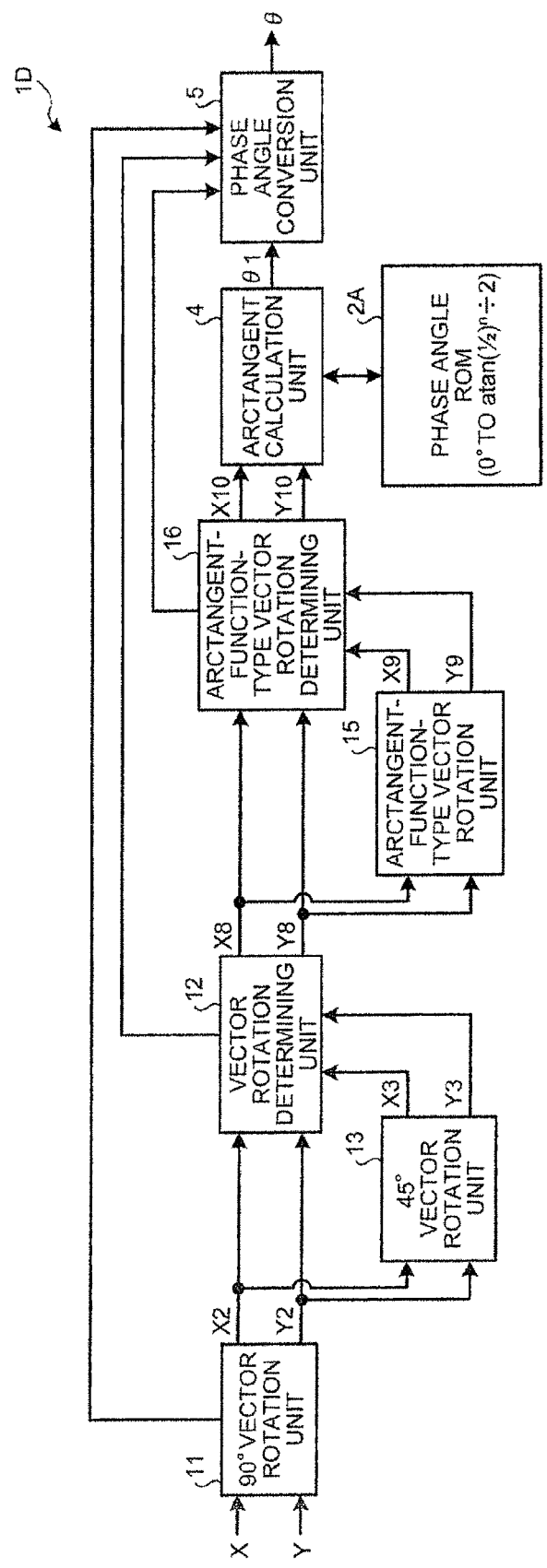
FIG. 12 is a block diagram of an internal configuration of an arctangent calculation apparatus according to a fifth embodiment.

FIG. 12 is a block diagram of an internal configuration of an arctangent calculation apparatus according to the fifth embodiment. Herein, the constituent elements identical to those in the arctangent calculation apparatus 1A according to the second embodiment are referred to by the same reference numerals and the redundant explanation regarding the configuration and operations is not repeated.

An arctangent calculation apparatus 1D illustrated in FIG. 12 includes the 90° vector rotation unit 11, the vector rotation determining unit 12, the 45° vector rotation unit 13, and the arctangent calculation unit 4.

In addition, the arctangent calculation apparatus 1D includes an arctangent-function-type vector rotation unit 15 and an arctangent-function-type vector rotation determining unit 16 that are disposed in between the vector rotation determining unit 12 and the arctangent calculation unit 4.

The arctangent-function-type vector rotation determining unit 16 determines whether a two-dimensional vector value (X8, Y8) corresponding to in the range of 0° to 22.5° is a two-dimensional vector value equivalent to an angle of arctangent function arctan(½)÷2. Herein, if arctangent function arctan(½) is 26.6°, then the arctangent function arctan(½)÷2 is equal to 13.3°.

If a two-dimensional vector value (X8, Y8) is a two-dimensional vector value corresponding to in an angle of arctangent function arctan(½)÷2, then the arctangent-function-type vector rotation determining unit 16 inputs that two-dimensional vector value (X8, Y8) without change to the arctangent calculation unit 4.

On the other hand, if a two-dimensional vector value (X8, Y8) is not a two-dimensional vector value corresponding to in an angle of arctangent function arctan(½)÷2, then the arctangent-function-type vector rotation determining unit 16 inputs that two-dimensional vector value (X8, Y8) to the arctangent-function-type vector rotation unit 15.

The arctangent-function-type vector rotation unit 15 sets, as a rotation angle, the value of arctangent function arctan (½)$^n$ (n=integer) of the two-dimensional vector value (X8, Y8) corresponding to in the range of 0° to 22.5°.

Then, the arctangent-function-type vector rotation unit 15 performs a vector rotation operation on the two-dimensional vector value (X8, Y8) with the set rotation angle and converts the two-dimensional vector value (X8, Y8) into a two-dimensional vector value (X9, Y9) corresponding to in an angle of arctangent function arctan(½)÷2.

Moreover, the arctangent-function-type vector rotation unit 15 outputs the two-dimensional vector value (X9, Y9) as a two-dimensional vector value (X10, Y10) to the arctangent calculation unit 4 via the arctangent-function-type vector rotation determining unit 16.

A phase angle ROM 2A is used to manage the phase angles θ1 that correspond to the two-dimensional vector values (X10, Y10) corresponding to in the range of 0° to angle of arctangent function arctan(½)÷2.

In the phase angle ROM 2 according to the first four embodiments are stored the phase angles θ1 corresponding to two-dimensional vector values corresponding to in the range of 0° to 22.5°. In contrast, in the phase angle ROM 2A are stored the phase angles θ1 corresponding to two-dimensional vector values (X10, Y10) corresponding to in the range of 0° to 13.3°. That enables achieving a substantial reduction in the memory size.

Explained below are the operations performed by the arctangent calculation apparatus 1D according to the fifth embodiment. Herein, for the sake of simplicity in the explanation, the angle of arctangent function arctan(½)÷2 is assumed to be 13.3°.

When the arctangent-function-type vector rotation determining unit 16 detects, via the vector rotation determining unit 12, a two-dimensional vector value (X8, Y8) corresponding to in the range of 0° to 22.5°, it determines whether the two-dimensional vector value (X8, Y8) is a two-dimensional vector value corresponding to in 13.3°.

If the two-dimensional vector value (X8, Y8) is a two-dimensional vector value corresponding to in 13.3°, then the arctangent-function-type vector rotation determining unit 16 determines that the two-dimensional vector value (X8, Y8) is a two-dimensional vector value corresponding to in the range of 0° to 13.3°.

In that case, the arctangent-function-type vector rotation determining unit 16 inputs that two-dimensional vector value (X8, Y8) as a two-dimensional vector value (X10, Y10) to the arctangent calculation unit 4.

On the other hand, if the two-dimensional vector value (X8, Y8) is not a two-dimensional vector value corresponding to in 13.3°, then the arctangent-function-type vector rotation determining unit 16 converts the two-dimensional vector value (X8, Y8) into a two-dimensional vector value corresponding to in the range of 0° to 13.3°.

The arctangent-function-type vector rotation unit 15 sets the value of, for example, arctangent function arctan(½) as a rotation angle and, with that rotation angle, converts the two-dimensional vector value (X8, Y8) into a two-dimensional vector value (X9, Y9) corresponding to in the range of 0° to 13.3°.

Then, the arctangent-function-type vector rotation unit 15 inputs the two-dimensional vector value (X9, Y9) corresponding to in the range of 0° to 13.3° to the arctangent-function-type vector rotation determining unit 16.

Subsequently, the arctangent-function-type vector rotation determining unit 16 inputs the two-dimensional vector value (X9, Y9) as a two-dimensional vector value (X10, Y10) to the arctangent calculation unit 4.

Upon detecting the two-dimensional vector value (X10, Y10), the arctangent calculation unit 4 outputs, from the phase angle ROM 2A, a phase angle θ1 that corresponds to the two-dimensional vector value (X10, Y10) and then inputs the phase angle θ1 to the phase angle conversion unit 5.

Upon detecting the output of the phase angle θ1 within the range of 0° to 13.3° from the arctangent calculation unit 4, the phase angle conversion unit 5 converts the phase angle θ1 within the range of 0° to 13.3° into a phase angle θ within the range of 0° to 360° by using (A1+A2)+(D1×D2)×θ1 and using a reverse conversion value of arctan(½).

Hence, in the arctangent calculation apparatus 1D, it is the phase angle conversion unit 5 that obtains a phase angle θ within the range of 0° to 360°.

In the fifth embodiment, two-dimensional vector values (X, Y) corresponding to in the range of 0° to 360° are subjected to value range control for conversion into two-dimensional vector values (X10, Y10) corresponding to in the range of 0° to 13.3° and then input to the arctangent calculation unit 4. Thus, the phase angle ROM 2A needs to store therein only the phase angles θ1 corresponding to the two-dimensional vector values (X10, Y10) corresponding to in the range of 0° to 13.3°. That enables achieving substantial reduction in the memory size of the phase angle ROM 2A as compared to the conventional cases. Hence, according to the fifth embodiment, it becomes possible to downsize the circuit size of the arctangent calculation apparatus 1D as well as keep the manufacturing cost and the power consumption in check.

Moreover, in the fifth embodiment, if a two-dimensional vector value (X8, Y8) corresponding to in the range of 0° to 22.5° obtained by conversion is a two-dimensional vector value corresponding to in the range of 0° to 13.3°, then it is possible to output a phase angle θ1 that corresponds to the two-dimensional vector value (X10, Y10) from the phase angle ROM 2A.

Furthermore, in the fifth embodiment, if a two-dimensional vector value (X8, Y8) corresponding to in the range of 0° to 22.5° obtained by conversion is not a two-dimensional vector value corresponding to in the range of 0° to 13.3°, then that two-dimensional vector value is subjected to the vector rotation operation with the rotation angle of arctan(½) in order to a two-dimensional vector value corresponding to in the range of 0° to 13.3°. Subsequently, a phase angle θ1 corresponding to that two-dimensional vector value can be output from the phase angle ROM 2A.

Moreover, in the fifth embodiment, a two-dimensional vector value (X9, Y9) that is output upon conversion by the arctangent-function-type vector rotation unit 15 can be accurately represented as $(2 \times X8+Y8, -X8+2 \times Y8)/\sqrt{5}$. However, since only a phase angle is required as the arctangent calculation result, $1/\sqrt{5}$ times can be ignored. Thus, during the arctangent-function-type vector rotation operation, a two-dimensional vector value (X9, Y9) can be obtained with only a simple circuit configuration of shifting and addition without having to use a multiplier. At the same time, it is also possible to repeatedly reduce the value range by performing the vector rotation operation until the circuit size and the processing delay reach appropriate values.

Meanwhile, in the fifth embodiment, an increase in the coefficient n in arctangent function $\arctan(½)^n$ used by the arctangent-function-type vector rotation unit 15 results in a smaller rotation angle. Hence, in proportion to that, the input value range of the arctangent calculation unit 4 can be controlled.

Moreover, in the fifth embodiment, the arctangent-function-type vector rotation unit 15 is configured as a one-step unit. Alternatively, it is also possible to configure the arctangent-function-type vector rotation unit 15 as a multistep unit and further control the input value range of the arctangent calculation unit 4 in order to reduce the volume of data managed in the phase angle ROM 2A.

In the fifth embodiment, at the output stage of the vector rotation determining unit 12 are disposed the arctangent-function-type vector rotation unit 15 and the arctangent-function-type vector rotation determining unit 16. However, for example, the same advantage can also be achieved by disposing the arctangent-function-type vector rotation unit 15 and the arctangent-function-type vector rotation determining unit 16 at the input stage of the vector rotation determining unit 12 and the 45° vector rotation unit 13.

Meanwhile, in the abovementioned fourth embodiment, threshold determination for 22.5° that is close to 22.7° is performed using the determination condition "5.0X1<12.0Y1". However, in a strict sense, the determination condition "5.0X1<12.0Y1" is meant to perform threshold determination for 22.7°. Thus, while using the threshold determination condition "5.0X1<12.0Y1", the phase angle ROM 2 is also configured to manage two-dimensional vector values corresponding to in the range of 0° to 22.7°.

Moreover, in the fourth embodiment, the threshold determination with respect to, for example, the range of 0° to 22.5° is performed with a high degree of accuracy by including decimal points and the arctangent calculation result of the arctangent calculation unit 4 is output according to the threshold determination. However, instead of performing the threshold determination with a high degree of accuracy by including decimal points; if the degree of accuracy is set to units of 1°, then threshold determination for 22° is sufficient regarding the range of 0° to 22.5°. In that case, a condition "X1×a>Y1×b" (where a=1144, b=65536) is used and, if that condition is satisfied, then the threshold can be determined to be about 1° or less for two-dimensional vector values. Moreover, for units of 2° or more, the same condition can be used by varying the values of the coefficients a and b.

In the abovementioned five embodiments, the description is given regarding an arctangent calculation apparatus that is used in phase modulation. Besides, the embodiments are also applicable to an arctangent calculation apparatus that is used in high-speed communication processing, digital image processing, or fuzzy control processing.

Herein, although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

Of the processes described in the embodiments, all or part of the processes explained as being performed automatically can be performed manually. Similarly, all or part of the processes explained as being performed manually can be performed automatically by a known method. The processing procedures, the control procedures, specific names, various data, and information including parameters described in the embodiments or illustrated in the drawings can be changed as required unless otherwise specified.

The constituent elements of the device illustrated in the drawings are merely conceptual, and need not be physically configured as illustrated.

The process functions performed by the device are entirely or partially realized by a central processing unit (CPU) (or a microcomputer such as a micro processing unit (MPU) or a micro controller unit (MCU)) or computer programs that are analyzed and executed by the CPU (or microcomputer such as MPU or MCU), or realized as hardware by wired logic.

According to an aspect of the present invention, two-dimensional vector values corresponding to in the range of 0° to 360° are subjected to value range control for conversion into two-dimensional vector values corresponding to in the range of 0° to 22.5° without having to use complex arithmetic processing such as multiplication and division and then input to an arctangent calculation unit. Thus, a phase angle memory unit needs to store therein only those phase angles that correspond to the two-dimensional vector values corresponding to in the range of 0° to 22.5°. That enables achieving reduction in the memory size of the phase angle memory unit as compared to the conventional cases. Hence, it becomes possible to downsize the circuit size of the arctangent calculation apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An arctangent calculation apparatus comprising:
    a phase angle memory unit in which a phase angle is stored in advance, the phase angle corresponding to a two-dimensional vector value corresponding to in a range of 0° to substantially 22.5°;
    a vector rotation unit that performs a vector rotation operation on a two-dimensional vector value corresponding to in a range of 0° to 360° and converts the two-dimensional vector value corresponding to in a range of 0° to 360° into a two-dimensional vector value corresponding to in a range of 0° to substantially 22.5°;
    an arctangent calculation unit that outputs, from the phase angle memory unit, a phase angle that corresponds to the two-dimensional vector value corresponding to in a range of 0° to substantially 22.5° obtained by conversion by the vector rotation unit; and
    a phase angle conversion unit that converts the phase angle output by the arctangent calculation unit into a phase angle in a range of 0° to 360°.

2. The arctangent calculation apparatus according to claim 1, wherein
    the vector rotation unit includes
        a 90° vector rotation unit that performs a 90° vector rotation operation on the two-dimensional vector value corresponding to in a range of 0° to 360° and converts the two-dimensional vector value corresponding to in a range of 0° to 360° into a two-dimensional vector value corresponding to in a range of 0° to 45°;
        a substantially 22.5° vector determining unit that determines whether the two-dimensional vector value corresponding to in a range of 0° to 45° obtained by conversion by the 90° vector rotation unit is a two-dimensional vector value corresponding to in substantially 22.5°; and
        a substantially 45° vector rotation unit, if the substantially 22.5° vector determining unit determines that a two-dimensional vector value is not a two-dimensional vector value corresponding to in substantially 22.5° or less, performs a substantially 45° vector rotation operation on the two-dimensional vector value and converts the two-dimensional vector value into a two-dimensional vector value corresponding to in a range of 0° to substantially 22.5°, and
        if the substantially 22.5° vector determining unit determines that a two-dimensional vector value is a two-dimensional vector value corresponding to in substantially 22.5° or less, the vector rotation unit outputs a two-dimensional vector value corresponding to in a range of 0° to substantially 22.5° obtained by conversion by the 90° vector rotation unit.

3. The arctangent calculation apparatus according to claim 2, wherein, upon performing the 45° vector rotation operation on the two-dimensional vector value, the substantially 45° vector rotation unit inverts the two-dimensional vector value by 180° around a 0° axis from among vector coordinate axes so that the two-dimensional vector value is converted into a two-dimensional vector value corresponding to in a range of 0° to substantially 22.5°.

4. The arctangent calculation apparatus according to claim 2, further comprising:
    an angle vector determining unit that determines whether the two-dimensional vector value corresponding to in a range of 0° to substantially 22.5° obtained by conversion by the substantially 45° vector rotation unit is a two-dimensional vector value corresponding to in half of a first angle that is a value of arctangent function arctan (½); and
    an arctangent function vector rotation unit that, if the angle vector determining unit determines that a two-dimensional vector value is not a two-dimensional vector value corresponding to in half of the first angle, performs a vector rotation operation on the two-dimensional vector value with a second angle that is a value of n-th power (n=integer) of arctangent function arctan(½) and converts the two-dimensional vector value into a two-dimensional vector value corresponding to in a range of 0° to half of the first angle, wherein
    the phase angle memory unit stores therein, in advance, a phase angle that corresponds to the two-dimensional vector value corresponding to in a range of 0° to half of the first angle, and
    the arctangent calculation unit outputs, from the phase angle memory unit, the phase angle corresponding to the two-dimensional vector value corresponding to in a range of 0° to half of the first angle obtained by conversion by the vector rotation unit.

5. The arctangent calculation apparatus according to claim 1, wherein the vector rotation unit includes
    a substantially-within-22.5° determining unit that determines whether the two-dimensional vector value corresponding to in a range of 0° to 360° is a two-dimensional vector value corresponding to in substantially 22.5° or less from any one of the 0° axis, a 90° axis, a 180° axis, and a 270° axis on vector coordinates;
    a 90° vector rotation unit, if the substantially-within-22.5° determining unit determines that the two-dimensional vector value is a two-dimensional vector value corresponding to in substantially 22.5°, performs the 90° vector rotation operation on the two-dimensional vector value and converts the two-dimensional vector value into a two-dimensional vector value corresponding to in a range of 0° to substantially 22.5°; and
    a substantially 45° vector rotation unit, if the substantially-within-22.5° determining unit determines that a two-dimensional vector value is not a two-dimensional vector value corresponding to in substantially 22.5° or less, performs the substantially 45° vector rotation operation on the two-dimensional vector value, converts the two-dimensional vector value into a two-dimensional vector value corresponding to in substantially 22.5° or less, and inputs the two-dimensional vector value corresponding to in substantially 22.5° or less to the 90° vector rotation unit.

6. The arctangent calculation apparatus according to claim 5, wherein, upon performing the 45° vector rotation operation on the two-dimensional vector value, the substantially 45° vector rotation unit inverts the two-dimensional vector value by 180° around closest of the 0° axis, the 90° axis, the 180° axis and the 270° axis from the two-dimensional vector value so that the two-dimensional vector value is converted into a two-dimensional vector value corresponding to in a range of 0° to substantially 22.5°.

7. The arctangent calculation apparatus according to claim 5, further comprising:
- an angle vector determining unit that determines whether the two-dimensional vector value corresponding to in a range of 0° to substantially 22.5° obtained by conversion by the 90° vector rotation unit is a two-dimensional vector value corresponding to in half of a first angle that is a value of arctangent function arctan(½); and
- an arctangent function vector rotation unit that, if the angle vector determining unit determines that a two-dimensional vector value is not a two-dimensional vector value corresponding to in half of the first angle, performs a vector rotation operation on the two-dimensional vector value with a second angle that is a value of n-th power (n=integer) of arctangent function arctan(½) and converts the two-dimensional vector value into a two-dimensional vector value corresponding to in a range of 0° to half of the first angle, wherein
- the phase angle memory unit stores therein, in advance, a phase angle that corresponds to the two-dimensional vector value corresponding to in a range of 0° to half of the first angle, and
- the arctangent calculation unit outputs, from the phase angle memory unit, the phase angle corresponding to the two-dimensional vector value corresponding to in a range of 0° to half of the first angle obtained by conversion by the vector rotation unit.

8. The arctangent calculation apparatus according to claim 1, wherein the substantially 22.5° is equivalent to 22.7°.

9. A non-transitory computer readable storage medium having stored therein an arctangent calculation program, the arctangent calculation program causing a computer to execute a process comprising:
- storing a phase angle in a phase angle memory unit, the phase angle corresponding to a two-dimensional vector value corresponding to in a range of 0° to substantially 22.5°;
- performing a vector rotation operation on a two-dimensional vector value corresponding to in a range of 0° to 360° to convert the two-dimensional vector value corresponding to in the range of 0° to 360° into a two-dimensional vector value corresponding to in a range of 0° to substantially 22.5°;
- outputting, from the phase angle memory unit, a phase angle that corresponds to the two-dimensional vector value corresponding to in a range of 0° to substantially 22.5° obtained by the vector rotation operation; and
- converting the output phase angle into a phase angle in a range of 0° to 360°.

10. The non-transitory computer readable storage medium according to claim 9, wherein
the vector rotation operation includes
- performing a 90° vector rotation operation on the two-dimensional vector value corresponding to in a range of 0° to 360° to convert the two-dimensional vector value corresponding to in a range of 0° to 360° into a two-dimensional vector value corresponding to in a range of 0° to 45°;
- determining whether the two-dimensional vector value corresponding to in a range of 0° to 45° obtained by the 90° vector rotation operation is a two-dimensional vector value corresponding to in substantially 22.5°; and
- performing, if it is determined that a two-dimensional vector value is not a two-dimensional vector value corresponding to in substantially 22.5° or less, a substantially 45° vector rotation operation on the two-dimensional vector value and converts the two-dimensional vector value into a two-dimensional vector value corresponding to in a range of 0° to substantially 22.5°, and
- outputting, if it is determined that a two-dimensional vector value is a two-dimensional vector value corresponding to in substantially 22.5° or less, a two-dimensional vector value corresponding to in a range of 0° to substantially 22.5° obtained by the 90° vector rotation operation.

* * * * *